United States Patent [19]

Holm et al.

[11] 4,086,976

[45] May 2, 1978

[54] ISOLATED CLEAN AIR CHAMBER AND ENGINE COMPARTMENT IN A TRACTOR VEHICLE

[75] Inventors: Charles H. Holm, Plainfield; William L. Schubert, Downers Grove, both of Ill.

[73] Assignee: International Harvester Company, Chicago, Ill.

[21] Appl. No.: 765,163

[22] Filed: Feb. 2, 1977

[51] Int. Cl.² ............................................. B60K 11/04
[52] U.S. Cl. ................................ 180/54 A; 123/41.49; 180/68 R
[58] Field of Search ................. 180/54 A, 69 R, 68 R, 180/69 C, 68 P, 54 D; 123/41.49, 41.48, 41.7; 165/41, 44

[56] References Cited

U.S. PATENT DOCUMENTS

| | | | |
|---|---|---|---|
| 1,263,227 | 4/1918 | George et al. | 180/68 R X |
| 1,386,493 | 8/1921 | Guyot | 123/41.49 |
| 1,723,813 | 8/1929 | Schneider | 180/69 R |
| 1,724,649 | 8/1929 | Fischer | 180/54 A |
| 1,920,883 | 8/1933 | Perkins | 180/54 A |
| 3,237,614 | 3/1966 | Bentz | 123/41.49 |
| 3,866,580 | 2/1975 | Whitehurst et al. | 180/54 A |

Primary Examiner—Joseph F. Peters, Jr.
Assistant Examiner—Milton L. Smith
Attorney, Agent, or Firm—Douglas W. Rudy; Ronald C. Kamp; F. David AuBuchon

[57] ABSTRACT

A tractor vehicle having an engine in a heat and sound controlling enclosure. A plurality of access apertures are provided therein including a pair or evacuation apertures for allowing the passage of heated air out from the enclosure. A second enclosure through which a flow of ambient air is drawn has an air intake and filter and a plurality of heat exchanging units housed therein. A flow inducing fan draws air through the chamber and the heat exchangers and directs it directly out the front grille of the vehicle.

8 Claims, 5 Drawing Figures

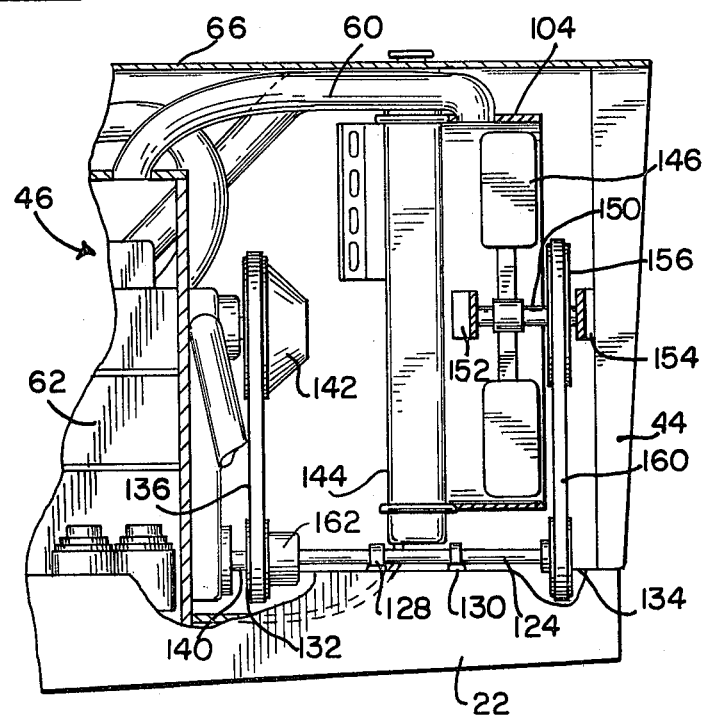
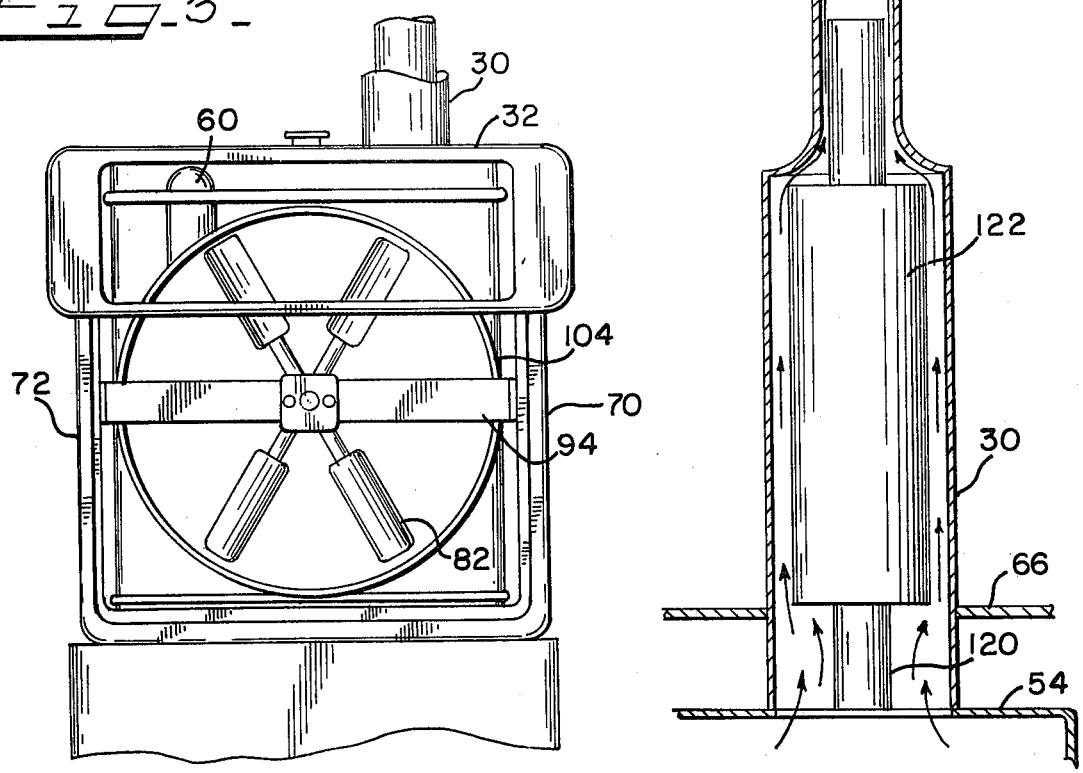

ISOLATED CLEAN AIR CHAMBER AND ENGINE COMPARTMENT IN A TRACTOR VEHICLE

BACKGROUND OF THE INVENTION

1. Field of the Invention

Agricultural tractor vehicles generally. Specifically agricultural tractors of conventional layout having a first chamber enclosing the engine and a second chamber enclosing an ambient air corridor. Engine heat is evacuated from the engine enclosure by apertures providing venturi, convection and vacuum effects. Air flow is induced in the ambient air corridor by a fan which discharges the spent air out the front of the tractor.

Ancillary equipment is interposed in the air flow path throughout the ambient air conduit. Typically an air intake, an integral air cleaner and a variety and plurality of heat exchangers would reside in this second chamber.

2. Description of the Prior Art

Agricultural tractor vehicles of contemporary ilk are equipped with front mounted heat exchangers ahead of an engine driven sucker fan. Air flow is drawn through the grille at the front of the vehicle, and then through the heat exchangers between the grille and the fan. Oftentimes more than just engine coolant radiators are placed in the air flow stream. The temperature of the air flow is increased substantially after passing through such heat exchangers. Nevertheless it is usually directed around the engine block before escaping out the bottom of the engine compartment. This problem is eliminated in the instant invention.

There are prior art engine enclosures that are designed to suppress the noise of the engine from the host vehicle. For instance there are motor bus patents, automobile patents and tractor vehicle patents that show enclosed engines.

A tractor vehicle having some but not all of the features of this invention is shown in U.S. Pat. No. 3,866,580 of Whitehurst, et al. This patent teaches the use of separate compartments for the engine and the heat exchanger where heat is drawn out of the engine and drive line section of the vehicle by a venturi effect exhaust pipe. Ambient air is drawn through the heat exchanger by a non-engine driven fan and is expelled out the front or grille portion of the vehicle. There are significant differences between this prior art tractor and the presented invention as will be pointed out.

A fan induced exhaust manifold draft plenum, where a front discharge fan draws air through a heat exchanger and also evacuates heated air from an exhaust manifold enclosing chamber, is shown in U.S. Pat. No. 3,237,614 to Bentz. The primary distinction between this device and the instant invention is that in the instant invention the fan induces evacuation flow in a conduit emanating from a full enclosure surrounding the entire engine rather than just the exhaust manifold.

The instant invention incorporates specific enclosures, one for containing engine heat and the other for containing ambient air. The first enclosure is evacuated through the use of an exhaust system convection and venturi effect device and also by means of a conduit between the first enclosure and the zone between the radiator and the fan. The fan sucks the air through the radiator and discharges it out the front of the vehicle.

SUMMARY OF THE INVENTION

A tractor vehicle having a main frame supported on a front steerable axle and a rear driven axle incorporates a first enclosure surrounding the engine and a second enclosure as an ambient air plenum acting as a conduit.

The first enclosure comprises top, side and end panels affixed together to form a bottomless container. There is no floor portion of the first enclosure. The enclosure panels may be equipped with sound attenuating material bonded to either the inner or outer surface thereof to control engine noise. In addition to the opened bottom of the first enclosure the enclosure is also provided with at least an aperture to accommodate a convection or venturi effect exhaust means and an aperture allowing communication with a duct leading to the front (discharge) side of the heat exchanger.

The second enclosure comprises a top panel, two side panels, a bottom panel and one end panel. The side panels are provided with screened air source inlet or louvers allowing ambient air entry into the second enclosure. Ambient air exits through the opened end of the second enclosure which is in a position associated with the usual grille location on a contemporary tractor vehicle.

The second enclosure surrounds the engine air intake provision (air cleaner, etc.) so that air being supplied to the engine is taken from the enclosure and is initially filtered by the screens of the intake air source inlet or louvers. Also inside the second enclosure are the operating fluid heat exchangers including the engine coolant heat exchanger, engine lubricating oil heat exchanger, the vehicle hydraulic fluid heat exchanger, and the air conditioner condenser. A sucker type fan driven off the engine, either via a drive shaft through the radiator or alternatively, a drive shaft below the radiator, draws ambient air into the second enclosure through the intake louvers, through the heat exchangers and out the opened forward facing grille opening of the second enclosure.

The instant invention offers the following advantages and improvements as well as others obvious from this specification. The dual chamber assembly improves engine cooling, reduces operator compartment temperatures, reduces and/or eliminates the impingement of the cooling fan blast on the ground thereby reducing dust agitation and allows the engine to be enclosed to reduce engine related sound levels at the operator's compartment or at by-pass noise sensing decibel meters.

BRIEF DESCRIPTION OF THE DRAWINGS

The objects and advantages of this invention will become apparent upon perusal of the drawing figures in which:

FIG. 3 is a front elevation view of the grille portion of the tractor vehicle of FIG. 1;

FIG. 4 is a presentation of the venturi and convection effect exhaust means of the vehicle; and FIG. 5 is an elevation view of the forward portion of an engine compartment having enclosing panels partially broken away.

DETAILED DESCRIPTION OF THE INVENTION

Figure 1:
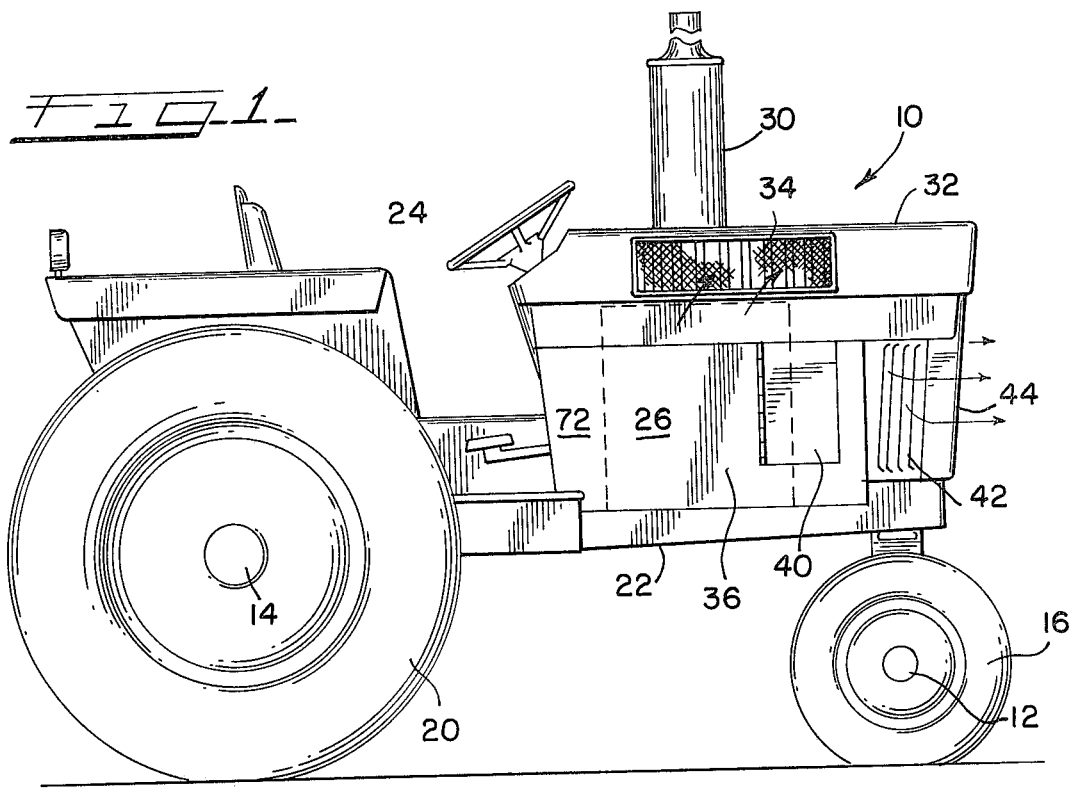
FIG. 1 presents a side elevation view of a tractor vehicle incorporating the invention.

An agricultural tractor vehicle generally 10, is supported on a forward steerable axle 12 and a rear driving axle 14 having forward and rear wheel and tire assemblies 16 and 20 respectively. A frame 22 supports the operator's work zone 24 and the engine compartment 26 on the axles 14 and 12. A four wheel vehicle is presented with the illustrated right side similar to the hidden left side.

Details shown in FIG. 1 of significance to this invention include the muffler shroud 30, the hood component 32, the screened hood intake grille 34 (one on each side of the hood), the side panels 36, the side intake grille 40 (which may have a door provided to prevent or control air intake volume), the side air exhaust grille 42 and the front air exhaust grille 44.

Although FIG. 1 presents an agricultural vehicle it is apparent that this invention would apply equally well to an industrial tractor vehicle and other tractor based vehicles either of the two wheel, four wheel, or multi-wheel drive variety having either a continuous chassis or an articulated chassis.

Figure 2:
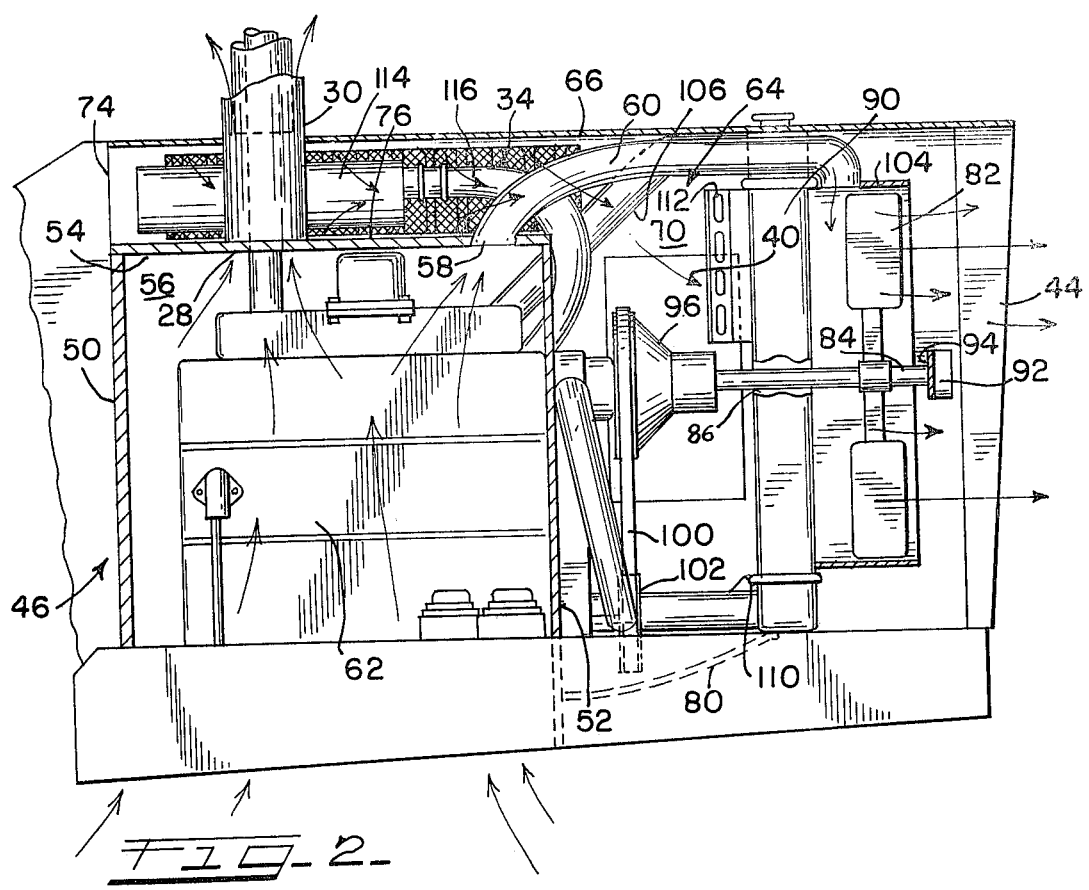
FIG. 2 is a side elevation view of a representative forward section of a tractor vehicle having a side panel removed to expose an embodiment of the invention.

FIG. 2 shows the details of the engine compartment and the first and second enclosures in a general layout. Minute details of the engine and various equipment have not been included for the sake of clarity.

The basic arrangement of the first enclosure, generally 46, includes a rear wall 50, a front wall 52, a top panel 54, a left side panel 56 and a right side panel which is not shown in this view as it has been removed to expose the engine 62. Notice that there is no floor portion for the first enclosure. This is to enable ambient air to be drawn in below the engine and wash over the engine before being exhausted through the muffler shroud 30 and the exhaust duct 60.

The second enclosure, generally 64, is enclosed by the hood panel 66, the left side panel 70, a right side panel 72 (FIG. 1), a back end panel 74, and first and second bottom panels 76 and 80. Air inlet openings are provided in the left and right side panels. A screened or louvered hood intake grille 34 is seen from the back side as it is located on the left side of the tractor. Also seen is the back side of a side intake grille 40.

A fan 82 is keyed to a fan shaft 84 which passes through an aperture 86 of the engine coolant heat exchanger 90. The fan shaft 84 is supported at its outboard end by a bearing 92 carried on support 94 and at its inboard end is supported for rotational movement by the drive pulley assembly 96 which is in turn supported by the water pump bearing (not shown). A belt 100 is driven from the engine crankshaft via crankshaft pulley 102.

A fan shroud 104 may surround the fan 82 to aid in flow inducement. Engine coolant may communicate between the engine 62 and the engine coolant heat exchanger 90 by means of an upper and a lower radiator hose 106 and 110 respectively.

An auxiliary heat exchanger such as the oil cooler 112 may be mounted to the intake side of the engine coolant heat exchanger as is current practice.

During vehicle operation ambient air will enter the first enclosure 46 from below the engine 62. The air will be induced upwardly to wash the engine in relatively cool air by means of the muffler shroud 30 and the exhaust duct 60.

The muffler shroud is shaped to provide a venturi effect due to the passage of gasses out the exhaust pipe proper. Inducement of fluid movement through the movement of a primary fluid, the exhaust gasses in this case, is known in the appropriate fluid dynamics art. Convection phenomena also is an aid extracting heat from the first enclosure 46 via the muffler shroud aperture.

The exhaust duct 60 is a low pressure suction source that also is used to induce flow through the first enclosure. The duct 60 communicates with low pressure area between the fan 82 and the heat exchanger 90. Heated air drawn through this duct is exhausted to the front of the vehicle along with heated air being drawn through the heat exchanger 90 by the fan 82.

Various arrows indicate air flow through the first enclosure and out the muffler shroud and exhaust duct.

Ambient air is also drawn into the second enclosure 64 by the fan 82. Entry is via the hood intake grilles 34 on either side of the hood and also via the side intake grilles 40 on either side of the engine compartment when desired. Aspiration air is drawn from this air supply through the air cleaner 114 for delivery as by intake duct 116 to the air delivery manifold (not shown). Ambient air is pulled through the heat exchangers 90 and 112 and is then pushed out the front grille area 44. A portion also escapes through the side air exhaust grilles 42 of FIG. 1.

By separating the cooling air from the engine heated air a greater temperature differential exists between the air passing through the heat exchangers and the coolant therein thus improving cooling. Ambient air most usually is passed first through the engine coolant heat exchanger then passed the engine to wash it and carry off radiant heat. In this embodiment ambient air is used to cool both the heat exchanger and the engine.

Air flow velocities through the engine compartment would be very low due to the large inlet area formed by the opened bottom of the engine enclosure. This low air velocity would not draw chaff into the engine compartment. As stated earlier the hot air drawn from the engine compartment through duct 60 would not pass through the engine coolant heat exchanger since it enters the air stream beyond the heat exchanger.

FIG. 3 presents a frontal view of a tractor engine compartment showing the fan 82, the bearing support 94, the fan shroud 104, and the exhaust duct 60. Also shown is the hood component 32, the muffler shroud 30, the left 70 and right 72 side panels. A grille screen (not shown) may be provided for cosmetic and safety considerations.

FIG. 4 presents a configuration of a simplified venturi effect muffler and shroud passing through the hood panel 66. The shroud 30 is supported on the top panel of the first enclosure 54 and surrounds an exhaust pipe 120 and a muffler 122. Arrows indicate the direction of heated air flow from the first enclosure out the venturi effect muffler. The exhaust velocity is used to draw air from the bottom of the opened main frame up across the engine and out around the exhaust pipe in the top of the hood. The muffler shroud is at the top of the engine compartment enclosure so it will act as a natural chimney and evacuate hot air from the engine compartment even after the engine is stopped.

FIG. 5 presents an alternative fan drive layout for use in an embodiment of the instant invention. Parts being identical to the first embodiment in this embodiment are the frame 22, the first enclosure 46, the engine 62, the hood panel 66, the exhaust duct 60 and the fan shroud 104 as well as other inconsequential parts. The change in this embodiment is the use of an auxiliary fan drive shaft 124 carried in a pair of pillow blocks 128 and 130 mounted to the frame 22. The auxiliary fan drive shaft 124 includes a pulley wheel 132 at its inboard end and a second drive pulley 134 at the outboard end of the shaft. A fan belt 136 is driven off the end of the crankshaft at 140 to turn the water pump driven pulley 142. The auxiliary fan drive shaft 124 passes under the alternative heat exchanger 144 thus negating the need for the aperture equipped heat exchanger 90 of FIG. 2. The fan 146 is carried on a short axle 150 supported by bearings at each end 152 and 154 and is driven by the driven fan pulley 156 via belt 160.

A flexible coupling 162 is used between the auxiliary fan drive shaft 124 and the end of the crankshaft 140 to eliminate alignment problems and to provide an easily disconnectible fitting to allow changing of belt 136. The belt 160 is located between the front air exhaust grille 44 and the fan 146, rather than between the fan and the heat exchanger 144 in order to allow this belt to be changed easily.

In this alternative embodiment the purpose and advantages of the first embodiment are retained, however, the fan is driven by the shaft 124 thus allowing full cooling use of the heat exchanger without the blockage of any core elements as is necessary to accommodate an aperture in the heat exchanger of FIG. 2.

Another advantage of this drive system is that the fan and the engine water pump are driven independently, thus allowing different speed ratios for the water pump and the fan, which would allow optimization of both ratios for improved engine cooling. Furthermore the fan position is not controlled by the water pump position, again allowing greater freedom to position the fan for optimum performance.

Both embodiments have been found to present a cooler running tractor vehicle than those currently in the field. One of the outstanding advantages of this structure is however, the entrapment and control of engine noise. It is expected that the engine enclosure panels will be made of sound attenuating material which would significantly reduce the noise emanating from the engine. Mounting the fan on the grille side of the heat exchanger also has a positive effect on the reduction of noise. Noise generated by the fan, usually a significant source of noise, would have to pass through the heat exchanger and past the engine enclosure and the back end panel 74 before entering the operator's work zone. "Line of sight" noise paths will be mostly out the front grille of the tractor or down towards the ground from the engine compartment.

An advantage of the alternative embodiment as shown in FIG. 5, vis-a-vis noise, is that the fan can be driven at a speed much slower than is normally possible due to the independence between the fan and the water pump. As the fan is slowed the noise it generates is also reduced thus yielding a significant noise reduction potential.

The location of the intake grilles high on the sides of the front of the tractor is also an advantage as chaff and debris generally does not get to this height level. As a normal tractor moves through a high stand of corn the normal front grille, when serving as an intake, is frequently blocked with chaff and leafy debris. The intake layout of the instant invention avoids this problem as the front grille is an air flow exit.

Thus it has been shown that there is provided a tractor vehicle having a multiple chambered engine compartment for filling the objects and advantages set forth previously in this application.

What is claimed is:

1. In a tractor vehicle having a frame to which the vehicle engine and the engine coolant heat exchanger are mounted, a chambered engine compartment comprising:
   a first enclosure surrounding the vehicle engine having an opened bottom and a plurality of apertures including a muffler shroud accompanying aperture and an exhaust duct accompanying aperture;
   a second enclosure housing an engine coolant heat exchanger;
   an engine driven fan located outboard of said heat exchanger for drawing air through said second enclosure housing and through said heat exchanger;
   an exhaust duct having a first end connected to said exhaust duct accompanying aperture and a second end located on the fan side of said heat exchanger between said heat exchanger and said fan whereby said fan may draw air from said duct and propel it forward out the front of said tractor vehicle.

2. The invention in accordance with claim 1 wherein the first enclosure comprises a rear wall, a front wall, a top panel having said muffler shroud aperture and said exhaust duct aperture, and left and right side panels affixed together forming an insulated sound attenuating opened bottom enclosure around the vehicle engine.

3. The invention in accordance with claim 1 wherein the second enclosure comprises a hood panel, left and right aperture equipped side panels, a back end panel, a first and second bottom panel all affixed together to form an enclosure housing said engine cooling heat exchanger and said engine driven fan.

4. The invention in accordance with claim 1 wherein said engine coolant heat exchanger is mounted in said tractor vehicle between said first enclosure and said engine driven fan.

5. The invention in accordance with claim 1 wherein said first enclosure surrounding the vehicle engine may be evacuated by a plurality of flow inducing devices including a muffler shroud surrounding an exhaust muffler of the engine emanating from the muffler shroud accompanying aperture and said exhaust duct and said fan whereby communication of air flow from said first enclosure is accomplished through both exhaust muffler induced and fan induced draft.

6. In a tractor vehicle having a frame to which the vehicle engine and the engine coolant heat exchanger are mounted, a chambered engine compartment comprising:
   a first enclosure having a rear wall, a front wall, a top panel having a plurality of apertures, and left and right side panels arranged to form an insulated sound attenuating enclosure around said vehicle engine;
   a second enclosure having a hood panel, left and right aperture equipped side panels, a back end panel, and first and second bottom panels arranged to form an enclosure housing said engine coolant heat exchanger;
   an engine driven fan located outboard of said heat exchanger for drawing air through said second enclosure housing and through said heat exchanger;

an exhaust duct having a first end for receiving air from one of said apertures of said first enclosure, and the exhaust duct having a second end located on the outboard side of said heat exchanger whereby said fan may draw air through said duct from said first enclosure;

a muffler shroud placed above a second of said apertures of said first enclosure enabling heated air in said first enclosure a path of escape through convection phenomena.

7. The invention in accordance with claim 6 wherein said engine coolant heat exchanger has an aperture therethrough and is mounted ahead of said engine and said engine driven fan is carried on a fan drive shaft passing through said aperture of said engine coolant heat exchanger.

8. The invention in accordance with claim 6 wherein said engine driven fan is supported on a short axle supported by bearings located outboard of said heat exchanger and further the engine driven fan is driven by an auxiliary drive shaft passing under the engine coolant heat exchanger.

* * * * *